(12) United States Patent
Young et al.

(10) Patent No.: US 12,307,897 B2
(45) Date of Patent: May 20, 2025

(54) SYSTEM TO PREDICT VEHICLE PARKING BUNCHING

(71) Applicant: HERE GLOBAL B.V., Eindhoven (NL)

(72) Inventors: Jeremy Michael Young, Chicago, IL (US); Leon Stenneth, Chicago, IL (US); Jerome Beaurepaire, Courbevoie (FR)

(73) Assignee: HERE GLOBAL B.V., Eindhoven (NL)

(*) Notice: Subject to any disclaimer, the term of this patent is extended or adjusted under 35 U.S.C. 154(b) by 222 days.

(21) Appl. No.: 18/085,398

(22) Filed: Dec. 20, 2022

(65) Prior Publication Data

US 2024/0203255 A1 Jun. 20, 2024

(51) Int. Cl.
*G01C 21/00* (2006.01)
*G01C 21/36* (2006.01)
*G08G 1/14* (2006.01)

(52) U.S. Cl.
CPC ......... *G08G 1/146* (2013.01); *G01C 21/3685* (2013.01); *G01C 21/3691* (2013.01)

(58) Field of Classification Search
CPC .... G08G 1/146; G08G 1/0129; G08G 1/0141; G08G 1/143; G08G 1/144; G08G 1/147; G08G 1/148; G01C 21/3685; G01C 21/3691; G01C 21/00
USPC .......................................................... 701/409
See application file for complete search history.

(56) References Cited

U.S. PATENT DOCUMENTS

| | | | |
|---|---|---|---|
| 9,355,063 | B2 | 5/2016 | Scharmann et al. |
| 2016/0247326 | A1 | 8/2016 | de Souza et al. |
| 2016/0321926 | A1 | 11/2016 | Mayer et al. |
| 2019/0163826 | A1* | 5/2019 | Arquero ................. G06N 20/00 |
| 2019/0385265 | A1* | 12/2019 | Liu ........................ H04W 4/029 |
| 2020/0005641 | A1* | 1/2020 | Park ........................ G08G 1/168 |
| 2020/0410861 | A1* | 12/2020 | Nellros ................. G08G 1/143 |
| 2023/0045377 | A1* | 2/2023 | Monassebian ..... G06Q 30/0185 |

OTHER PUBLICATIONS

Gomari, et al., "Cluster Analysis of Parking Behaviour: a Case Study in Munich," Technical University of Munich, Transportion Research Procedia, vol. 52, 2021, pp. 485-492.
Soubam, et al., "BluePark: Tracking Parking and Un-Parking Events in Indoor Parking Iot," IIT Delhi (10pgs.).
Soler et al., "Creation of a Web Application for Smart Park System and Parking Prediction Study for System Integration," Institute of New Imaging Technologies.

* cited by examiner

*Primary Examiner* — Shardul D Patel
(74) *Attorney, Agent, or Firm* — Jason Wejnert; HERE GLOBAL B.V.

(57) ABSTRACT

A system, a method and a computer program product are provided to predict vehicle parking bunching in a geographic region. For example, the system is configured to obtain a plurality of contextual features and/or a plurality of sensor data related to parking information in the geographic region. The system is configured to predict a vehicle parking bunching based on a vehicle unparking threshold, a vehicle separation distance cluster threshold and/or unparking vehicle information. The system may also be configured to alert a vehicle of the vehicle parking bunching with a vehicle parking bunching notification.

17 Claims, 4 Drawing Sheets

SYSTEM TO PREDICT VEHICLE PARKING BUNCHING

TECHNOLOGICAL FIELD

An example aspect of the present disclosure generally relates to determining vehicle clustering, and more particularly, but without limitation relates to a system, a method, and a computer program product to predict vehicle parking bunching for a vehicle to find an available space in which to park.

BACKGROUND

Vehicle clustering may occur randomly but also at times coincident with social events, time of day or business operations. It is not uncommon to see multiple parking spaces nearby suddenly becoming free in an area which sees a dense parking situation, at any time of the day. For example, in public transport, bus bunching refers to a group of two or more transit vehicles (such as buses or trains), which were scheduled to be evenly spaced running along the same route, but instead are running in the same location at the same time. Congestion, wasted time looking for parking spaces and other negative effects accompany vehicle clustering and bunching, especially when a vehicle, whether driven by a person or autonomous vehicle, must search for an empty parking spot without foreknowledge of availability.

BRIEF SUMMARY

In an aspect of the disclosure, a system to predict vehicle parking bunching in a geographic region is disclosed. The system includes at least one memory configured to store computer executable instructions and at least one processor. The processor is configured to execute the computer executable instructions to obtain a plurality of contextual features and/or a plurality of sensor data related to parking information in the geographic region; predict a vehicle parking bunching based on a vehicle unparking threshold, a vehicle separation distance cluster threshold and/or unparking vehicle information; and alert a vehicle of the vehicle parking bunching with a vehicle parking bunching notification.

In an aspect of the disclosure, method to predict vehicle parking in a geographic region is disclosed. The method includes obtaining a plurality of contextual features and/or a plurality of sensor data related to parking information in the geographic region; predicting a vehicle parking bunching based on a vehicle unparking threshold, a vehicle separation distance cluster threshold and/or unparking vehicle information; and alerting a vehicle of the vehicle parking bunching with a vehicle parking bunching notification.

In an aspect of the disclosure, a computer program product for detecting copyright infringement is disclosed. The computer program product includes a non-transitory computer readable medium having stored thereon computer executable instructions, which when executed by one or more processors, cause the one or more processors to carry out operations to obtain a plurality of contextual features and/or a plurality of sensor data related to parking information in the geographic region; predict a vehicle parking bunching based on a vehicle unparking threshold, a vehicle separation distance cluster threshold and/or unparking vehicle information; and alert a vehicle of the vehicle parking bunching with a vehicle parking bunching notification.

The foregoing summary is illustrative only and is not intended to be in any way limiting. In addition to the illustrative aspects, aspects, and features described above, further aspects, aspects, and features will become apparent by reference to the drawings and the following detailed description.

BRIEF DESCRIPTION OF THE DRAWINGS

Having thus described certain aspects of the disclosure in general terms, reference will now be made to the accompanying drawings, which are not necessarily drawn to scale, and wherein:

DETAILED DESCRIPTION

Some aspects of the present disclosure will now be described more fully hereinafter with reference to the accompanying drawings, in which some, but not all, aspects are shown. Indeed, various aspects may be embodied in many different forms and should not be construed as limited to the aspects set forth herein; rather, these aspects are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with aspects of the present disclosure. Thus, use of any such terms should not be taken to limit the spirit and scope of aspects of the present disclosure.

For purposes of this disclosure, though not limiting or exhaustive, "vehicle" refers to standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle ("AV") may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one aspect, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

For purposes of this disclosure, though not limiting or exhaustive, "transfer learning" refers to a technique in in machine learning (ML) that focuses on storing knowledge gained while solving one problem and applying it to a different but related problem, where transfer learning attempts to use a source domain of prior data from a different but related context and a prior target domain to generate a new target predictive function for the new data set being evaluated for the first time.

Vehicles may bunch up or cluster in parking areas and/or unpark from clusters of parking spots for several reasons. Some of the main reasons leading to vehicle parking bunching include: people leaving home at the same time in the morning to reach a factory or workplace at a certain time; people leaving at the same time for a lunch break; people working in shift pattern (mornings, afternoons and nights); POI and events starting or ending; family dinner/event ending; train schedules; hours of operations of stores (e.g., due to opening at 9 am or closing at 10 pm); work-out or activity classes; schools and day care; restaurants (e.g., 3 turns of table in the evening); weddings; funerals; groups of people leaving a restaurant together will likely create a certain number of unparking events and other situations that may be time dependent or context dependent.

Accordingly, there is a need for assisting a driver or autonomous vehicle to predict a vehicle parking bunching or cluster to discover parking space availability and notify the driver or vehicle.

The present disclosure addresses predicting vehicle parking bunching to determine parking space availability. Hereinafter, the term "vehicle" is used interchangeably with "human-assisted driver in a vehicle, an autonomous vehicle ("AV") or a hybrid combination of both). The disclosed system allows for inputs such as map database information, point of interest information, event information, historical parking information, mobility graph information, satellite communications data, radio-frequency communications data, nearby unmanned autonomous vehicle information, historical weather data, driver preference information, reserved parking information, online service information, etc. The disclosed system may obtain sensor data, such as proximity sensor data, motion detection sensor data, accelerometer data, weather sensor data, positioning sensor data, external remote sensor data, etc. The disclosed system may alert a vehicle of the vehicle parking bunching with a vehicle parking bunching notification, such as a vehicle routing notification for a location of the vehicle parking bunching, a timing notification for the vehicle related to the vehicle parking bunching, etc.

In an aspect of the disclosure, user interfaces ("UI") may alert a vehicle of the vehicle parking bunching with a vehicle parking bunching notification. Examples of UI vehicle parking bunching notification may include an audible alert, a visual alert, a vehicle console display alert, an in-vehicle infotainment ("IVI") alert, an augmented reality-based alert, a heads-up display alert, a haptic alert, etc.

In an aspect of the disclosure, the system may predict a vehicle parking bunching based on a vehicle unparking threshold, a vehicle separation distance cluster threshold and/or unparking vehicle information, sensor data provided by internal, vehicle and external sensors. The method may use a clustering scan algorithm, such as a density-based spatial clustering of applications with noise ("DBSCAN"). The system may also leverage a trained machine learning ("ML") based on contextual features, sensor data and output from the clustering scan algorithm. In an aspect, when a vehicle is arriving at a geographic region not visited before or where contextual or sensor data is sparse or unavailable, the system may use transfer learning to assist the ML model to predict a vehicle parking bunching in a novel geographic region.

Figure 1:
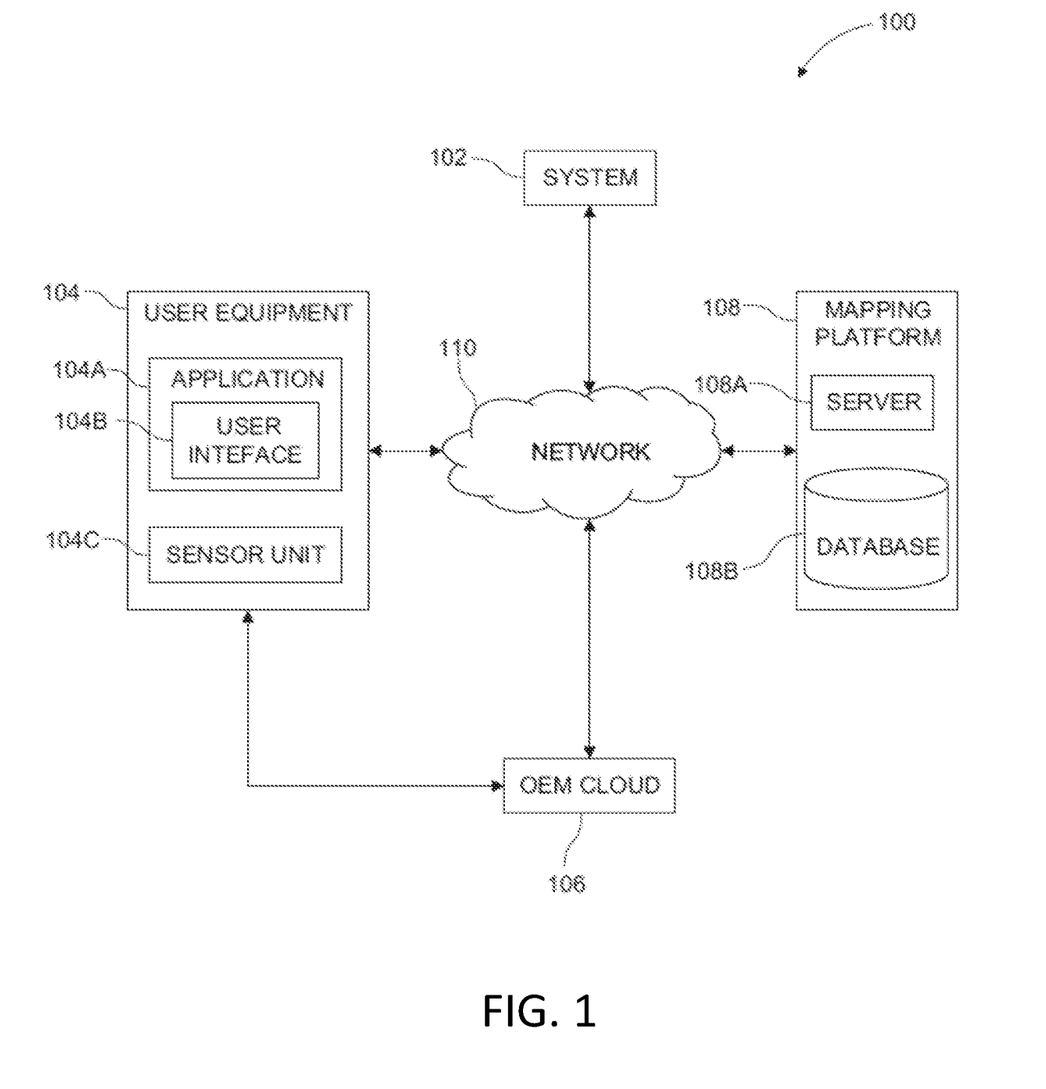
FIG. 1 illustrates a schematic diagram of a network environment of a system for predicting vehicle parking bunching, according to an aspect of the disclosure.

FIG. 1 illustrates a schematic diagram of a network environment 100 of a system 102 to predict a vehicle parking bunching. The system 102 may be communicatively coupled with, a user equipment (UE) 104, an OEM cloud 106, a mapping platform 108, via a network 110. The UE 104 may be a vehicle electronics system, onboard automotive electronics/computers, a mobile device such as a smartphone, tablet, smart watch, smart glasses, laptop, wearable device or other UE platforms known to one of skill in the art. The mapping platform 108 may further include a server 108A and a database 108B. The user equipment 104 includes an application 104A, a user interface 104B, and a sensor unit 104C. Further, the server 108A and the database 108B may be communicatively coupled to each other.

The system 102 may comprise suitable logic, circuitry, interfaces and code that may be configured to process the sensor data obtained from the UE 104 for parking features and information in a geographic region, to use, in part, for a vehicle seeks parking. The system 102 may be communicatively coupled to the UE 104, the OEM cloud 106, and the mapping platform 108 directly via the network 110. Additionally, or alternately, in some example aspects, the system 102 may be communicatively coupled to the UE 104 via the OEM cloud 106 which in turn may be accessible to the system 102 via the network 110.

All the components in the network environment 100 may be coupled directly or indirectly to the network 110. The components described in the network environment 100 may be further broken down into more than one component and/or combined together in any suitable arrangement. Further, one or more components may be rearranged, changed, added, and/or removed. Furthermore, fewer or additional components may be in communication with the system 102, within the scope of this disclosure.

The system 102 may be embodied in one or more of several ways as per the required implementation. For example, the system 102 may be embodied as a cloud-based service or a cloud-based platform. As such, the system 102 may be configured to operate outside the UE 104. However, in some example aspects, the system 102 may be embodied within the UE 104. In each of such aspects, the system 102 may be communicatively coupled to the components shown in FIG. 1 to carry out the desired operations and wherever required modifications may be possible within the scope of the present disclosure.

The UE 104 may be a vehicle electronics system, in-vehicle infotainment ("IVI") system, onboard automotive electronics/computers, a mobile device such as a smartphone, tablet, smart watch, smart glasses, laptop, wearable device and the like that is portable in itself or as a part of another portable/mobile object, such as, a vehicle known to one of skill in the art. The UE 104 may comprise a processor, a memory and a network interface. The processor, the memory and the network interface may be communicatively coupled to each other. In some example aspects, the UE 104 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example aspects, the UE 104 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the UE 104. Additional, different, or fewer components may be provided. For example, the UE 104 may be configured to execute and run mobile applications such as a messaging application, a browser application, a navigation application, and the like. In accordance with an aspect, the UE 104 may be directly coupled to the system 102 via the network 110. For example, the UE 104 may be a dedicated vehicle (or a part thereof) for gathering data for development of the map data in the database 108B. In some example aspects, the UE 104 may be coupled to the system 102 via the OEM cloud 106 and the network 110. For example, the UE 104 may be a consumer mobile phone (or a part thereof) and may be a beneficiary of the services provided by the system 102. In some example aspects, the UE 104 may serve the dual purpose of a data gatherer and a beneficiary device. The UE 104 may be configured to provide sensor data to the system 102. In accordance with an aspect, the UE 104 may process the sensor data for traffic features that may be used to predict vehicle parking bunching in a geographic region. Further, in accordance with an aspect, the UE 104 may be configured to perform processing related to predicting vehicle parking bunching.

The UE 104 may include the application 104A with the user interface 104B to access one or more applications. The application 104A may correspond to, but not limited to, map related service application, navigation related service application and location-based service application. In other words, the UE 104 may include the application 104A with the user interface 104B.

The sensor unit 104C may be embodied within the UE 104. The sensor unit 104C comprising one or more sensors may capture sensor data, in a certain geographic location. In accordance with an aspect, the sensor unit 104C may be built-in, or embedded into, or within interior of the UE 104. The one or more sensors (or sensors) of the sensor unit 104C may be configured to provide the sensor data comprising location data associated with a location of a user. In accordance with an aspect, the sensor unit 104C may be configured to transmit the sensor data to an Original Equipment Manufacturer (OEM) cloud. Examples of the sensors in the sensor unit 104C may include, but not limited to, a microphone, a camera, an acceleration sensor, a gyroscopic sensor, a LIDAR sensor, an ultrasonic detector, a proximity sensor, a weather sensor and a motion sensor.

The sensor data may refer to sensor data collected from a sensor unit 104C in the UE 104. In accordance with an aspect, the sensor data may be collected from a large number of mobile phones. In accordance with an aspect, the sensor data may refer to the point cloud data. The point cloud data may be a collection of data points defined by a given coordinates system. In a 3D coordinates system, for instance, the point cloud data may define the shape of some real or created physical objects. The point cloud data may be used to create 3D meshes and other models used in 3D modelling for various fields. In a 3D Cartesian coordinates system, a point is identified by three coordinates that, taken together, correlate to a precise point in space relative to a point of origin. The LIDAR point cloud data may include point measurements from real-world objects or photos for a point cloud data that may then be translated to a 3D mesh or NURBS or CAD model. In accordance with an aspect, the sensor data may be converted to units and ranges compatible with the system 102, to accurately receive the sensor data at the system 102. Additionally, or alternately, the sensor data of a UE 104 may correspond to movement data associated with a user of the user equipment. Without limitations, this may include motion data, position data, orientation data, acceleration data, with respect to a reference and the like.

The mapping platform 108 may comprise suitable logic, circuitry, interfaces and code that may be configured to store map data associated with a geographic area around and including a geographic region where parking information is desired. The map data may include traffic features and include historical road layouts, such as pre-existing road networks, business, educational and recreational locations, parking restrictions in certain areas, POI locations and information, construction plans, lighting conditions, a time of day when vehicles park or unpark in frequency, whether a shared vehicle is used in a certain time period and location, historical weather conditions in the geographic region, point of interest information, event information, historical parking information, mobility graph information, satellite communications data, radio-frequency communications data, nearby unmanned autonomous vehicle information, historical weather data, driver preference information, reserved parking information, online service information or a combination thereof. The server 108A of the mapping platform 108 may comprise processing means and communication means. For example, the processing means may comprise one or more processors configured to process requests received from the system 102 and/or the UE 104. The processing means may fetch map data from the database 108B and transmit the same to the system 102 and/or the UE 104 in a suitable format. In one or more example aspects, the mapping platform 108 may periodically communicate with the UE 104 via the processing means to update a local cache of the map data stored on the UE 104. Accordingly, in some example aspects, map data may also be stored on the UE 104 and may be updated based on periodic communication with the mapping platform 108.

In an aspect, the map data may include, and the database 108B of the mapping platform 108 may store real-time, dynamic data about road features to assist with predicting a vehicle parking bunching in a geographic region. For example, real-time data may be collected for overall business activities at the intersection; parking restrictions or construction impeding parking at certain locations, event timing, business, educational, recreational, instructional and fitness class information, recent use of a shared vehicle in the area, real-time weather conditions in the geographic region, etc. Other data records may include computer code instructions and/or algorithms for executing a cluster scanning algorithm, trained machine learning model or other statistical data methods that are capable of predicting vehicle parking bunching in a geographic region.

The database 108B of the mapping platform 108 may store map data of one or more geographic regions that may correspond to a city, a province, a country or of the entire world. The database 108B may store point cloud data collected from the UE 104. The database 108B may store data such as, but not limited to, node data, road segment data, link data, point of interest (POI) data, link identification information, and heading value records. The database 108B may also store cartographic data, routing data, and/or maneuvering data. According to some example aspects, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities for identifying location of building.

Optionally, the database 108B may contain path segment and node data records, such as shape points or other data that may represent pedestrian paths, links or areas in addition to or instead of the vehicle road record data. The road/link segments and nodes can be associated with attributes, such as geographic coordinates, street names, address ranges, speed limits, parking conditions and availability, turn restrictions at intersections, and other navigation related attributes, as well as POIs, such as fueling stations, hotels, restaurants, museums, stadiums, offices, auto repair shops, buildings, stores, parks, etc. The database 108B may also store data about the POIs and their respective locations in the POI records. The database 108B may additionally store data about places, such as cities, towns, or other communities, and other geographic features such as bodies of water, and mountain ranges. Such place or feature data can be part of the POI data or can be associated with POIs or POI data records (such as a data point used for displaying or representing a position of a city). In addition, the database 108B may include event data (e.g., traffic incidents, construction activities, scheduled events, unscheduled events, accidents, diversions etc.) associated with the POI data records or other records of the database 108B. Optionally or additionally, the database 108B may store 3D building maps data (3D map model of objects) of structures, topography and other visible features surrounding roads and streets.

The database 108B may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the UE 104. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the database 108B may be a master geographic database, but in alternate aspects, the database 108B may be embodied as a client-side map database and may represent a compiled navigation database that may be used in or with end user devices (such as the UE 104) to provide navigation and/or map-related functions. In such a case, the database 108B may be downloaded or stored on the end user devices (such as the UE 104).

The network 110 may comprise suitable logic, circuitry, and interfaces that may be configured to provide a plurality of network ports and a plurality of communication channels for transmission and reception of data, such as the sensor data, map data from the database 108B, etc. Each network port may correspond to a virtual address (or a physical machine address) for transmission and reception of the communication data. For example, the virtual address may be an Internet Protocol Version 4 (IPv4) (or an IPV6 address) and the physical address may be a Media Access Control (MAC) address. The network 110 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 110 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) networks (for e.g. LTE-Advanced Pro), 5G New Radio networks, ITU-IMT 2020 networks, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

The system, apparatus, method and computer program product described above may be or may be implemented on any of a wide variety of computing devices and may be embodied by either the same or different computing devices. The system, apparatus, etc. may be embodied by a server, a computer workstation, a distributed network of computing devices, a personal computer or any other type of computing device. The system, apparatus, method and computer program product may be configured to predict vehicle parking bunching may similarly be embodied by the same or different server, computer workstation, distributed network of computing devices, personal computer, or other type of computing device.

Alternatively, the system, apparatus, method and computer program product may be embodied by a computing device on board a vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

Figure 2:
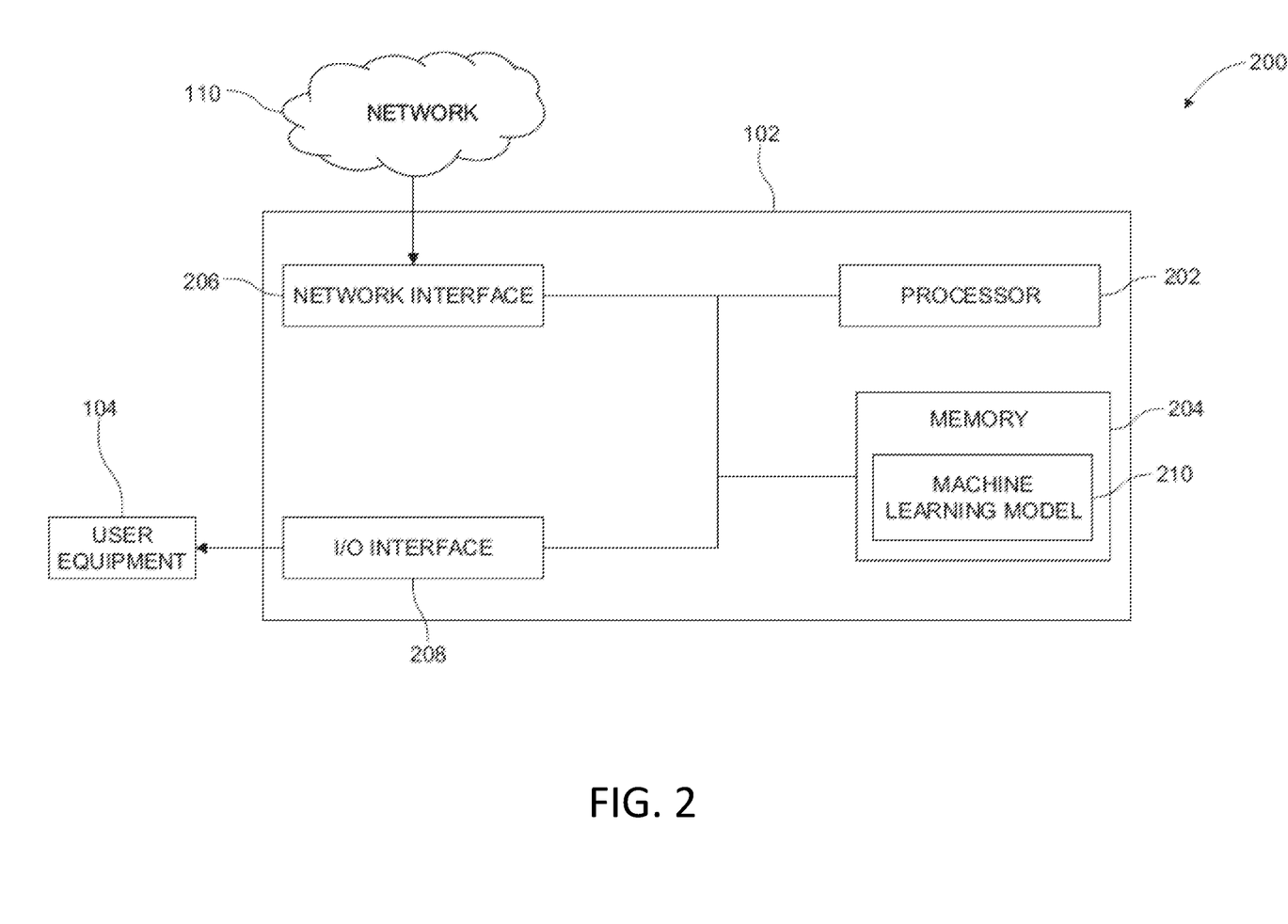
FIG. 2 illustrates a block diagram of the system for predicting vehicle parking bunching, according to an aspect of the disclosure.

FIG. 2 illustrates a block diagram 200 of the system 102, exemplarily illustrated in FIG. 1, for predicting vehicle parking bunching in a geographic region, in accordance with an example aspect. FIG. 2 is described in conjunction with elements from FIG. 1.

As shown in FIG. 2, the system 102 may comprise a processing means such as a processor 202, storage means such as a memory 204, a communication means, such as a network interface 206, an input/output (I/O) interface 208, and a machine learning model 210. The processor 202 may retrieve computer executable instructions that may be stored in the memory 204 for execution of the computer executable instructions. The system 102 may connect to the UE 104 via the I/O interface 208. The processor 202 may be communicatively coupled to the memory 204, the network interface 206, the I/O interface 208, and the trained machine learning model 210.

The processor 202 may comprise suitable logic, circuitry, and interfaces that may be configured to execute instructions stored in the memory 204. The processor 202 may obtain sensor data associated with vehicle parking information for a time duration. The sensor data may be captured by one or more UE, such as the UE 104. The processor 202 may be configured to determine vehicle parking bunching, based on the sensor data. The processor 202 may be further configured to predict, using a trained machine learning model 210, such as a clustering scan algorithm (DBSCAN), or a look-up table, vehicle parking bunching in a geographic region, from contextual features and/or sensor data associated with the geographic region surrounding and including the intersection.

Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 202 may implement a number of processor technologies known in the art such as a density-based spatial clustering of applications with noise ("DBSCAN"), a machine learning model, a deep learning model, such as a recurrent neural network (RNN), a convolutional neural network (CNN), and a feed-forward neural network, or a Bayesian model. As such, in some aspects, the processor 202 may include one or more processing cores configured to perform independently. A multi-core processor may enable multiprocessing within a single physical package.

Additionally, or alternatively, the processor 202 may include one or more processors configured in tandem via the bus to enable independent execution of instructions, pipelining and/or multithreading. Additionally, or alternatively, the processor 202 may include one or processors capable of processing large volumes of workloads and operations to provide support for big data analysis. However, in some cases, the processor 202 may be a processor specific device (for example, a mobile terminal or a fixed computing device) configured to employ an aspect of the disclosure by further configuration of the processor 202 by instructions for performing the algorithms and/or operations described herein.

In some aspects, the processor 202 may be configured to provide Internet-of-Things (IoT) related capabilities to users of the UE 104 disclosed herein. The IoT related capabilities may in turn be used to provide smart city solutions by providing real time parking updates, big data analysis, and sensor-based data collection for providing navigation and parking recommendation services. The environment may be accessed using the I/O interface 208 of the system 102 disclosed herein.

The memory 204 may comprise suitable logic, circuitry, and interfaces that may be configured to store a machine code and/or instructions executable by the processor 202. The memory 204 may be configured to store information including processor instructions for training and/or updating the trained machine learning model 210, such as the DBSCAN model. The memory 204 may be used by the processor 202 to store temporary values during execution of processor instructions. The memory 204 may be configured to store different types of data, such as, but not limited to, sensor data from the UE 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the components of the system 102 and other systems and devices in the network environment 100, via the network 110. The network interface 206 may communicate with the UE 104, via the network 110 under the control of the processor 202. In one aspect, the network interface 206 may be configured to communicate with the sensor unit 104C disclosed in the detailed description of FIG. 1. In an alternative aspect, the network interface 206 may be configured to receive the sensor data from the OEM cloud 106 over the network 110 as described in FIG. 1. In some example aspects, the network interface 206 may be configured to receive location information of a user associated with a UE (such as, the UE 104), via the network 110. In accordance with an aspect, a controller of the UE 104 may receive the sensor data from a positioning system (for example, a GPS or GLNSS-based positioning system) of the UE 104. The network interface 206 may be implemented by use of known technologies to support wired or wireless communication of the system 102 with the network 110. Components of the network interface 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 208 may comprise suitable logic, circuitry, and interfaces that may be configured to operate as an I/O channel/interface between the UE 104 and different operational components of the system 102 or other devices in the network environment 100. The I/O interface 208 may facilitate an I/O device (for example, an I/O console) to receive an input (e.g., sensor data from the UE 104 for a time duration) and present an output to one or more UE (such as, the UE 104) based on the received input. In accordance with an aspect, the I/O interface 208 may obtain the sensor data from the OEM cloud 106 to store in the memory 202. The I/O interface 208 may include various input and output ports to connect various I/O devices that may communicate with different operational components of the system 102. In accordance with an aspect, the I/O interface 208 may be configured to output the vehicle parking bunching and/or notifications, alerts or warnings related to the vehicle parking bunching to a user device, such as, the UE 104 of FIG. 1.

In example aspects, the I/O interface 208 may be configured to provide the data associated with vehicle parking bunching to the database 108A to update the map of a certain geographic region. In accordance with an aspect, a vehicle requesting information in a geographic region may be updated about historical and real-time data related to traffic conditions, parking conditions, parking restrictions, POI information and timing, event timing, infrastructure, signage, traffic lights and signals, vehicle size and count, roads and potentially problematic parking areas in a geographic region. Other historical and/or real-time information related to geographic and contextual information of the areas includes a size of the vehicle, a size of a parked vehicles in the geographic region, satellite communications data, radio-frequency communications data, nearby unmanned autonomous vehicle information, shared ride information, weather data, driver preference information, map database information, online service information and the like. Examples of the input devices may include, but is not limited to, a touch screen, a keyboard, a mouse, a joystick, a microphone, and an image-capture device. Examples of the output devices may include, but is not limited to, a display, an IVI console, an AR display, heads-up display, a speaker, a haptic output device, or other sensory output devices.

In an aspect of the disclosure, the processor 202 may predict vehicle parking bunching, based on a vehicle unparking threshold, a vehicle separation distance cluster threshold and/or unparking vehicle information. A vehicle unparking threshold may include a minimum number of vehicles unparking in a period of time to be considered parking bunching. For example, one vehicle unparking is not a bunch. However, in an aspect, 5 or more vehicles unparking in a time period may be considered a bunch. The geographic region and contextual information and/or sensor data may determine the vehicle unparking threshold. For example, 5 cars have to unpark at almost the same time within a distance threshold (e.g., 1 city block or 500 m) for it to be considered a parking bunch. A vehicle separation distance cluster threshold may specify a minimum separation distance between vehicles unparking to be considered a cluster or bunch. A large separation between unparking vehicles, such 100 meters, may not be considered a cluster in some situations. In other situations, such as involving parking for large trucks and trailers, 100 meters may be sufficient to be considered a bunch or cluster. Unparking vehicle information may include contextual information, such as POI information (estimated number of vehicles that may park or unpark for opening and closing times of a POI, for example), parking restrictions (such as limited or maximum time allowed for parking in a particular area of the geographic region or handicapped or reserved parking areas) or other contextual information to return vehicle parking bunching information.

In another aspect, a machine learning model, such as trained machine learning model 210 discussed earlier, may be used to predict vehicle parking bunching in a geographic region. In accordance with an aspect, the machine learning model 210 may be trained offline to obtain a classifier model to predict vehicle parking bunching in a geographic region based on a vehicle unparking threshold, a vehicle separation distance cluster threshold and/or unparking vehicle information. For the training of the trained machine learning model 210, different feature selection techniques and classification techniques may be used. The system 102 may be configured to obtain the trained machine learning model 210 and predict a vehicle parking bunching from a vehicle unparking threshold, a vehicle separation distance cluster threshold and/or unparking vehicle information, along with contextual features and/or sensor data obtained from the one or more UE, such as the UE 104 for obtaining the contextual features in a geographic region surrounding and including the geographic region where vehicle parking bunching is desired for parking availability. In one aspect, supervised machine learning techniques may be utilized where ground truth data is used to train the model for different scenarios and then in areas where there is not sufficient ground truth data, the trained machine learning model 210 can be used to predict features or results.

In an aspect, a look-up table for predicting vehicle parking bunching in a geographic region, where the look-up table is populated with entries of vehicle parking bunching based on a vehicle unparking threshold, a vehicle separation distance cluster threshold and/or unparking vehicle information.

In an aspect, the trained machine learning model 210 may comprise a density-based spatial clustering of applications with noise (DBSCAN) model to predict vehicle parking bunching in a geographic region, based on a vehicle unparking threshold, a vehicle separation distance cluster threshold and/or unparking vehicle information. A general flow for the DBSCAN model is shown below in pseudocode:

DBSCAN(DB, distFunc, eps, minCars) {/*distFunc is Euclidian, eps is actual distance measure, MinCars is minimum number of cars to be a bunch, DB is the set of all unparking cars*/

C:=0 /* Cluster counter */for each point P in database DB of call cars deparking {if label(P)≠undefined then continue /* Previously processed in inner loop */ Neighbors N:=RangeQuery(DB, distFunc, P, eps)/* Find other unparkers */if |N|<minCars then {/* Density check */ label(P):=Noise /* Label as Noise */continue}

C:=C+1 /* next cluster label */ label(P):=C /* Label initial point */ SeedSet S:=N\{P}/* Neighbors to expand */for each point Q in S {/* Process every seed point Q */if label(Q)=Noise then label(Q)≠C /* Change Noise to border point */ if label(Q)≠undefined then continue /* Previously processed (e.g., border point) */ label(Q):=C /* Label neighbor */ Neighbors N:=RangeQuery(DB, distFunc, Q, eps)/* Find neighbors */if |N|≥minCars then {/* Density check (if Q is a core point) */ S:=S U N /* Add new unparkers to seed set */}}}}.

In an aspect, the DBSCAN model described above accepts as input a vehicle unparking threshold, a vehicle separation distance cluster threshold and/or unparking vehicle information described above.

In an aspect, each time a cluster is detected using the DBSCAN model, a vehicle parking bunching notification is provided. When a vehicle parking bunching is detected, the information is used to update the database of unparking vehicle information, map, and visualizations. The DBSCAN model also detects parking noise through sensor data. Unparking vehicle notifications are not presented when parking noise is detected.

In an aspect, the machine learning model 210 may be complemented or substituted with a transfer learning model. The transfer learning model may be used when the plurality of contextual information and/or the plurality of sensor data for the location approached by the vehicle is unavailable, sparse, incomplete, corrupted or otherwise unreliable for determining vehicle parking bunching reliably. The transfer learning model may then use a vehicle unparking threshold, a vehicle separation distance cluster threshold and/or unparking vehicle information, along with contextual information and/or sensor data from other prior geographic regions and vehicle parking unbunching to assist in the current situation the driver faces.

Datasets comprising the sensor data may be used for building the trained machine learning model 210 with all vehicle parking bunching to be determined. For building the machine learning model 210, the sensor data may be obtained for fixed time duration, and a reference vehicle parking bunching may be assigned in the training data (such as, the sensor data, a reference vehicle unparking threshold, a reference vehicle separation distance cluster threshold and/or a reference unparking vehicle information) to learn from. Further, the contextual features that represent parking dynamics or stationarity may be determined, stored and fed to the machine learning model 210 building technique. Further, for building the machine learning model 210, the sensor data may be fed to the model building technique to run it to build and obtain the machine learning model 210. The vehicle parking bunching may be a target output used to build the machine learning model 210, and the contextual features that represent parking dynamics or stationarity constitute as input to the machine learning model 210 corresponding to the target output of a vehicle parking bunching. In accordance with an aspect, the machine learning model building technique may correspond to a classification technique, such as, but not limited to, decision trees and random forest.

In accordance with an aspect, various data sources may provide the contextual features and/or sensor data as an input to the machine learning model 210. In accordance with an aspect, contextual features may be provided as an input to the machine learning model 210. Examples of the machine learning model 210 other than the DBSCAN model may include, but not limited to, Decision Tree (DT), Random Forest, and Ada Boost. In accordance with an aspect, the memory 204 may include processing instructions for training of the machine learning model 210 with a dataset that may be real-time (or near real time) data or historical data. In accordance with an aspect, the data may be obtained from one or more service providers.

Figure 3:
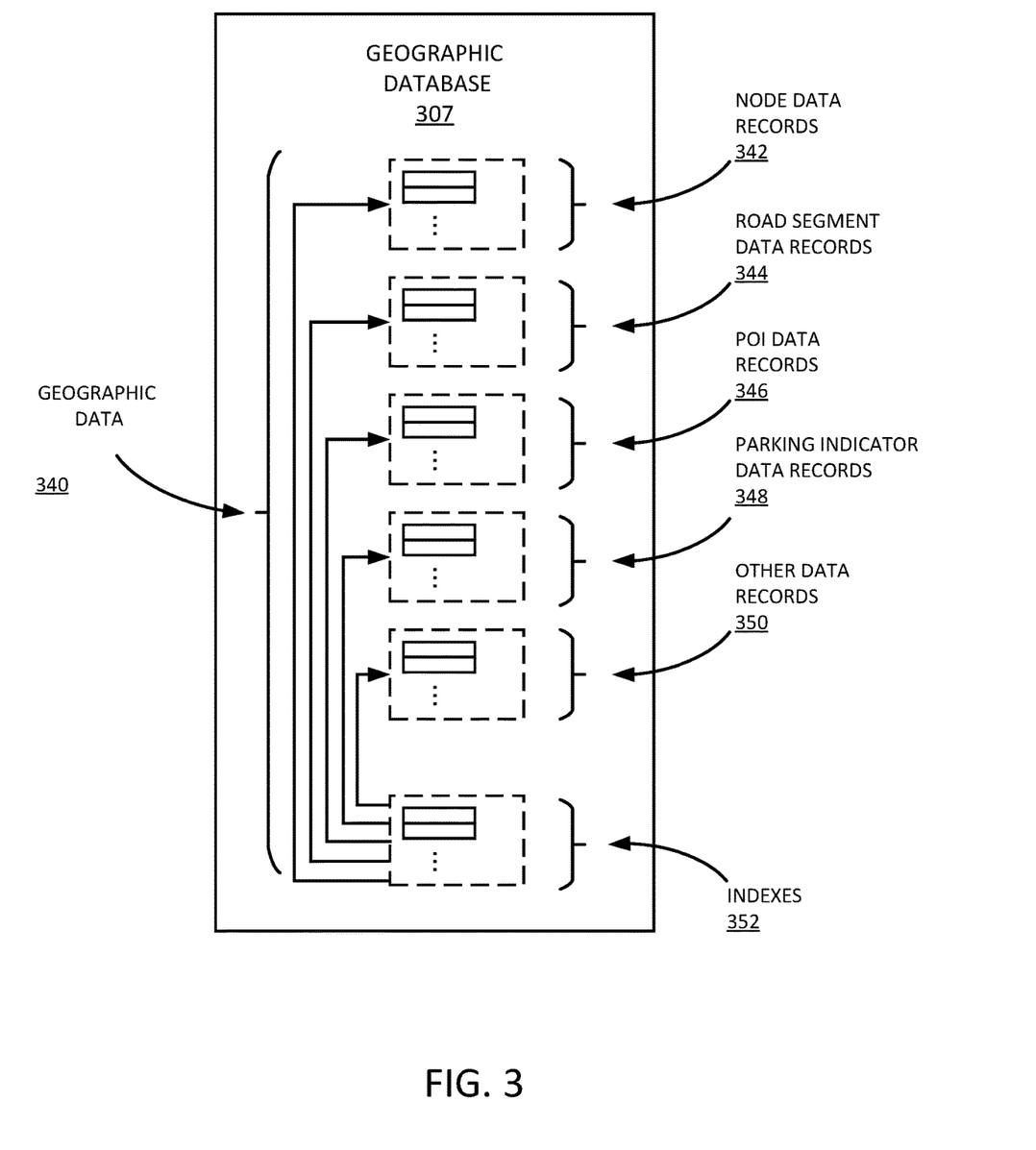
FIG. 3 illustrates an example map or geographic database for use by the system for predicting vehicle parking bunching, according to an aspect of the disclosure.

FIG. 3 illustrates an example map or geographic database 307, which may include various types of geographic data 340. The geographic database 307 may be similar to or an example of the database 108B. The data 340 may include but is not limited to node data 342, road segment or link data 344, map object and point of interest (POI) data 346, parking indicator data records 348, or the like (e.g., other data records 350 such as traffic data, sidewalk data, road dimension data, parking availability data, vehicle dimension/turning radius data, etc.). Other data records may include computer code instructions and/or algorithms for executing a trained machine learning model 210 that is capable of predicting vehicle parking bunching based on contextual and/or sensor information for a geographic region.

A profile of vehicle driving data (e.g., a driving and/or parking profile) such as vehicle driving and parking patterns (e.g., cautious, needing large space between vehicles to park, etc.) may be obtained by any functional manner including those detailed in U.S. Pat. Nos. 9,766,625 and 9,514,651, both of which are incorporated herein by reference. This data may be stored in one of more of the databases discussed above including as part of the turn indicator records 348 in some aspects. This data may also be stored elsewhere and supplied to the system 102 via any functional means.

In one aspect, the following terminology applies to the representation of geographic features in the geographic database 307. A "Node"—is a point that terminates a link, a "road/line segment"—is a straight line connecting two points, and a "Link" (or "edge") is a contiguous, non-branching string of one or more road segments terminating in a node at each end. In one aspect, the geographic database 307 follows certain conventions. For example, links do not cross themselves and do not cross each other except at a node. Also, there are no duplicated shape points, nodes, or links. Two links that connect each other have a common node.

The geographic database 307 may also include cartographic data, routing data, and/or maneuvering data as well as indexes 352. According to some example aspects, the road segment data records may be links or segments representing roads, streets, or paths, as may be used in calculating a route or recorded route information for determination of one or more personalized routes. The node data may be end points (e.g., intersections) corresponding to the respective links or segments of road segment data. The road link data and the node data may represent a road network, such as used by vehicles, cars, trucks, buses, motorcycles, bikes, scooters, and/or other entities.

Optionally, the geographic database 307 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, parking restrictions, and other navigation related attributes, as well as POIs, such as fueling stations, hotels, restaurants, museums, churches, schools, office buildings, hospitals stadiums, offices, auto repair shops, buildings, stores, parks, etc that may impact parking availability. The geographic database 307 can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the geographic database 307 can include event data (e.g., traffic incidents, construction activities, scheduled events, unscheduled events, etc.) associated with the POI data records or other records of the map database.

The geographic database 307 may be maintained by a content provider, e.g., the map data service provider and may be accessed, for example, by the content or service provider processing server. By way of example, the map data service provider can collect geographic data and dynamic data to generate and enhance the map database and dynamic data such as traffic-related and parking-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The map database 307 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the geographic database 307 may be a master geographic database, but in alternate aspects, a client-side map database may represent a compiled navigation database that may be used in or with end user devices to provide navigation and/or map-related functions. For example, the map database may be used with the mobile device to provide a vehicle with navigation features. In such a case, the map database can be downloaded or stored on the end user device which can access the map database through a wireless or wired connection, such as via a processing server and/or a network, for example.

The records for parking indicator data records 348 may include various points of data such as, but not limited to: parking lot or parking lane images, vehicle images, images of objects proximate to or in a parking lot or parking lanes, location and time/date information, height, width, and data on parked vehicles or objects present at the time when information on vehicle parking bunching is requested, etc. End user driving and parking profile data may also be included in the parking indicator data records 348 (or stored elsewhere). Driving and parking profile data such as the parking preferences, parking restriction and access information (such as possessing a handicapped parking label or permission), etc. may be included in some driving profiles.

Figure 4:
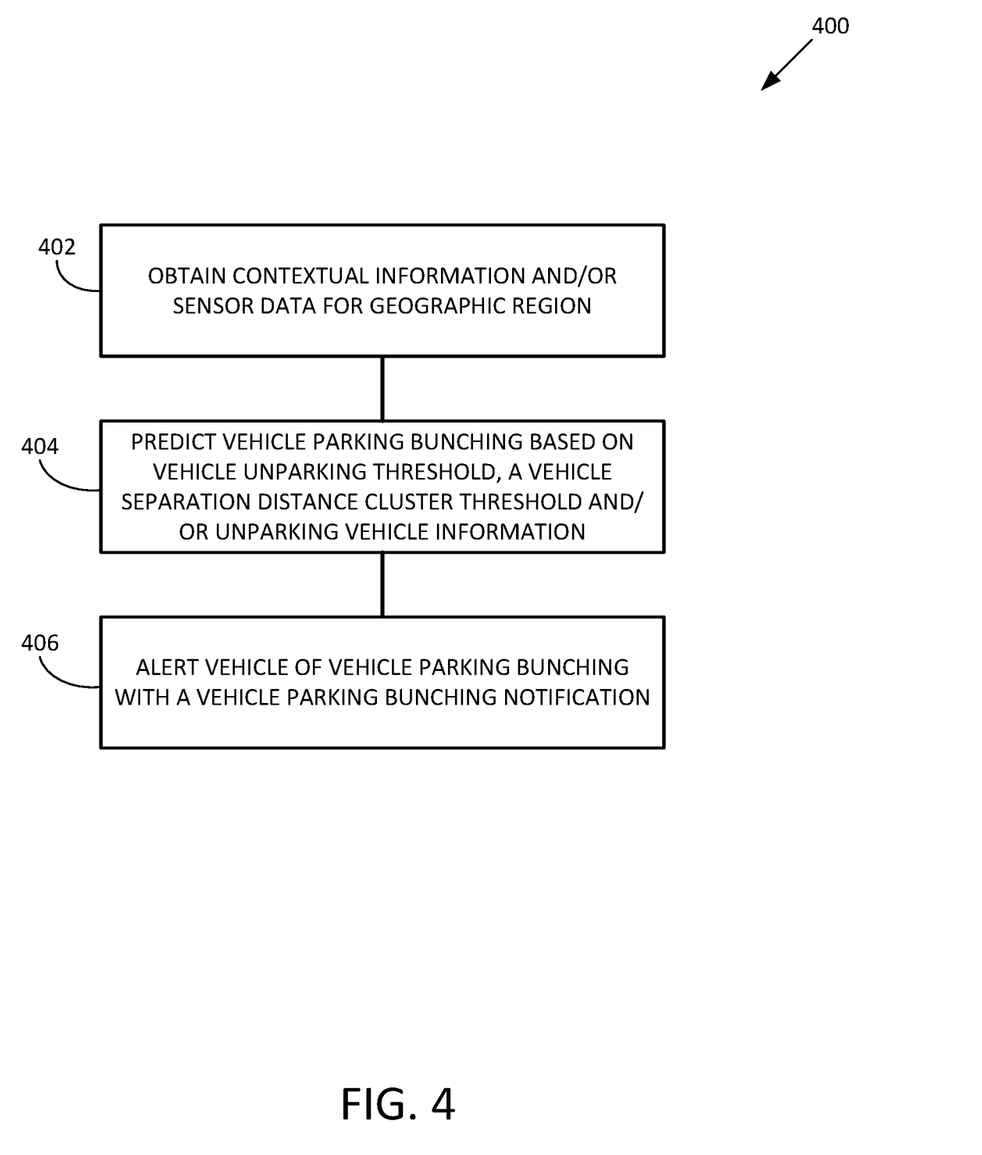
FIG. 4 illustrates a flowchart for acts taken in an exemplary method for predicting vehicle parking bunching, according to an aspect of the disclosure.

FIG. 4 illustrates a flowchart 400 for acts taken in an exemplary method for predicting vehicle parking bunching for a vehicle in a geographic region based on a plurality of contextual features and/or a plurality of sensor data in the geographic region, in accordance with an aspect. FIG. 4 is explained in conjunction with FIG. 1 to FIG. 3. The control starts at act 402.

At act 402, a plurality of contextual features and/or a plurality of sensor data related to the geographic region may be obtained for a time duration. In an aspect, the processor 202 may be configured to obtain the plurality of contextual features including, but not limited to, map database information, point of interest information, event information, historical parking information, mobility graph information, satellite communications data, radio-frequency communications data, nearby unmanned autonomous vehicle information, historical weather data, driver preference information, reserved parking information, online service information, etc.

In an aspect, the processor 202 may be configured to obtain the plurality of sensor data, including, but not limited to proximity sensor data, motion detection sensor data, accelerometer data, weather sensor data, positioning sensor data, external remote sensor data, etc. The sensor data may be obtained from one or more user equipment (UE) 104. In an aspect of the disclosure, the UE 104 may correspond to a mobile phone or an electronic device associated with the user or vehicle, such as an on-board vehicle computer, an IVI, smart phones, smart watches, smart wearable devices, tablets, laptop or notebook computers or other mobile devices. In an aspect, the UE 104 may include sensors associated with devices external to the vehicle and the user, such as weather sensors, positioning beacons and sensors, satellite, cellular and wide-area-network-connected sensors, RFID sensors or other external remote sensor devices and UEs known to one of skill in the art for vehicle transportation and traffic information systems.

At act 404, the processor 202 may predict vehicle parking bunching, based on a vehicle unparking threshold, a vehicle separation distance cluster threshold and/or unparking vehicle information. A vehicle unparking threshold may include a minimum number of vehicles unparking in a period of time to be considered parking bunching. For example, one vehicle unparking is not a bunch. However, in an aspect, 5 or more vehicles unparking in a time period may be considered a bunch. The geographic region and contextual information and/or sensor data may determine the vehicle unparking threshold. For example, 5 cars have to unpark at almost the same time within a distance threshold (e.g., 1 city block or 500 m) for it to be considered a parking bunch. A vehicle separation distance cluster threshold may specify a minimum separation distance between vehicles unparking to be considered a cluster or bunch. A large separation between unparking vehicles, such 100 meters, may not be considered a cluster in some situations. In other situations, such involving parking for large trucks and trailers, 100 meters may be sufficient to be considered a bunch or cluster. Unparking vehicle information may include contextual information, such as POI information (estimated number of vehicles that may park or unpark for opening and closing times of a POI, for example), parking restrictions (such as limited or maximum time allowed for parking in a particular area of the geographic region or handicapped or reserved parking areas) or other contextual information to return vehicle parking bunching information.

In an aspect, a machine learning model, such as trained machine learning model 210 discussed earlier, may be used to predict vehicle parking bunching in a geographic region. In accordance with an aspect, the machine learning model 210 may be trained offline to obtain a classifier model to predict vehicle parking bunching in a geographic region based on a vehicle unparking threshold, a vehicle separation distance cluster threshold and/or unparking vehicle information. For the training of the trained machine learning model 210, different feature selection techniques and classification techniques may be used. The system 102 may be configured to obtain the trained machine learning model 210 and predict a vehicle parking bunching from a vehicle unparking threshold, a vehicle separation distance cluster threshold and/or unparking vehicle information, along with contextual features and/or sensor data obtained from the one or more UE, such as the UE 104 for obtaining the contextual features in a geographic region surrounding and including the geographic region where vehicle parking bunching is desired for parking availability. In one aspect, supervised machine learning techniques may be utilized where ground truth data is used to train the model for different scenarios and then in areas where there is not sufficient ground truth data, the trained machine learning model 210 can be used to predict features or results.

In an aspect, a look-up table for predicting vehicle parking bunching in a geographic region, where the look-up table is populated with entries of vehicle parking bunching based on a vehicle unparking threshold, a vehicle separation distance cluster threshold and/or unparking vehicle information.

In an aspect, the trained machine learning model 210 may comprise a density-based spatial clustering of applications with noise (DBSCAN) model to predict vehicle parking bunching in a geographic region, based on a vehicle unparking threshold, a vehicle separation distance cluster threshold and/or unparking vehicle information. A general flow for the DBSCAN model is shown below in pseudocode:

unparking vehicle information, along with contextual information and/or sensor data from other prior geographic regions and vehicle parking unbunching to assist in the current situation the vehicle faces.

In an aspect, the system 102 may predict areas in the geographic region which are more prone to parking bunching. The system 102 may predict the size of the bunch, i.e., a number of parking spots likely to become free on this link or parking area. The system 102 may predict the number of bunches per day on links and/or predict the size of the parking bunch, map links that are covered by the parking bunch based on POIs close by, time of day, events, etc.

In an aspect of the disclosure, the disclosed system, method and computer program product to predict a vehicle parking bunching may allow applications such as grouping rides suggestions (vehicle sharing like Uber, Lyft or ZipCar), suggesting to people to possibly join rides in fewer cars, suggesting nearby alternate parking location and ways to reach final parking in a grouped manner. The disclosed system may also benefit moving companies which need several parking spaces at a time or may guide multiple drivers (e.g., 5 cars) to an arca where they could also park next to each other, on a link, road or geographic arca.

At act 406, the vehicle is alerted of the vehicle parking bunching with a vehicle parking bunching notification. In an aspect, the vehicle parking bunching notification may include provide a vehicle routing notification for a location of the vehicle parking bunching, a timing notification for the vehicle related to the vehicle parking bunching.

In an aspect, each time a bunch or cluster is detected using the DBSCAN model, a vehicle parking bunching notification is provided. When a vehicle parking bunching is detected, the information is used to update the database of unparking vehicle information, map, and visualizations. The DBSCAN model also detects parking noise through sensor data. Unparking vehicle notifications are not presented when parking noise is detected.

In an aspect, the vehicle parking bunching notification may suggest, if two links are likely to see vehicles leaving

```
DBSCAN(DB, distFunc, eps, minCars) { /*distFunc is Euclidian, eps is actual
distance measure, MinCars is minimum number of cars to be a bunch, DB is the set of all
unparking cars*/
    C := 0 /* Cluster counter */for each point P in database DB of call cars deparking
{ if label(P) ≠ undefined then continue /* Previously processed in inner loop */ Neighbors N
:= RangeQuery(DB, distFunc, P, eps) /* Find other unparkers */if |N| < minCars then { /*
Density check */ label(P) := Noise /* Label as Noise */continue }
    C := C + 1 /* next cluster label */ label(P) := C /* Label initial point */ SeedSet S
:= N \ {P} /* Neighbors to expand */for each point Q in S { /* Process every seed point Q */if
label(Q) = Noise then label(Q) := C /* Change Noise to border point */
    if label(Q) ≠ undefined then continue /* Previously processed (e.g., border point)
*/ label(Q) := C /* Label neighbor */ Neighbors N := RangeQuery(DB, distFunc, Q, eps) /*
Find neighbors */if |N| ≥ minCars then { /* Density check (if Q is a core point) */ S := S U N
/* Add new unparkers to seed set */ } } } }.
```

In an aspect, the DBSCAN model described above accepts as input a vehicle unparking threshold, a vehicle separation distance cluster threshold and/or unparking vehicle information described above.

In an aspect, the machine learning model 210 may be complemented or substituted with a transfer learning model. The transfer learning model may be used when the plurality of contextual information and/or the plurality of sensor data for the location approached by the vehicle is unavailable, sparse, incomplete, corrupted or otherwise unreliable for determining vehicle parking bunching reliably. The transfer learning model may then use a vehicle unparking threshold, a vehicle separation distance cluster threshold and/or at the same time and the vehicle is looking for a parking space, the system 102 may suggest the link with possible parking bunching if the vehicle is a large vehicle, as it will be more convenient to enter/leave the parking spot.

In an aspect, the vehicle parking bunching notification may include presenting vehicle parking bunches by presenting a link in a different way (such as a different color, shading, intensity of color, volume or frequency of audible signal, TTY notification) emphasizing the vehicle parking bunching notification in a certain way or showing multiple free spots in a geographic region.

In an aspect, the disclosed system 102 may inform a vehicle that a nearby link is likely to see multiple cars leaving their parking spaces due to an event ending. The system 102 may recommend a vehicle to leave 10 min earlier/later to benefit from a parking bunch opportunity around the destination in the geographic region. The system 102 may recommend a vehicle a location at which to to wait next to an upcoming parking bunch opportunity.

Blocks of the flowchart 400 support combinations of means for performing the specified functions and combinations of operations for performing the specified functions. It will also be understood that one or more blocks of the flowchart 400, and combinations of blocks in the flowchart 400, can be implemented by special purpose hardware-based computer systems which perform the specified functions, or combinations of special purpose hardware and computer instructions. Also, more, fewer or different steps may be provided.

Alternatively, the system 102 may comprise means for performing each of the operations described above. In this regard, according to an example aspect, examples of means for performing operations may comprise, for example, the processor 202 and/or a device or circuit for executing instructions or executing an algorithm for processing information as described above.

Although the aforesaid description of FIGS. 1-4 is provided with reference to the sensor data, however, it may be understood that the disclosure would work in a similar manner for different types and sets of data as well. The system 102 may generate/train the machine learning model 210 to evaluate different sets of data at various geographic locations. Additionally, or optionally, the vehicle parking bunching and/or vehicle parking bunching notification in the form of output data may be provided to an end user, as an update which may be downloaded from the mapping platform 110. The update may be provided as a run time update or a pushed update.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device of an apparatus employing an aspect of the present disclosure and executed by the processing circuitry. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Furthermore, in some aspects, additional optional operations may be included. Modifications, additions, or amplifications to the operations above may be performed in any order and in any combination.

Moreover, although the foregoing descriptions and the associated drawings describe example aspects in the context of certain example combinations of elements and/or functions, it should be appreciated that different combinations of elements and/or functions may be provided by alternative aspects without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system to predict a vehicle parking bunching in a geographic region, the system comprising:
    at least one memory configured to store computer executable instructions; and
    at least one processor configured to execute the computer executable instructions to:
    determine parking information in the geographic region using a proximity sensor, a motion detection sensor, an accelerometer, a weather sensor, a positioning sensor or a combination thereof;
    obtain a plurality of contextual features related to parking information in the geographic region;
    predict the vehicle parking bunching based on a vehicle unparking threshold, a vehicle separation distance cluster threshold and/or unparking vehicle information; and
    alert a vehicle of the vehicle parking bunching with a vehicle parking bunching notification.

2. The system of claim 1, where the computer executable instructions to obtain the plurality of contextual features comprise computer executable instructions to obtain map database information, point of interest information, event information, historical parking information, mobility graph information, satellite communications data, radio-frequency communications data, nearby unmanned autonomous vehicle information, historical weather data, driver preference information, reserved parking information, online service information or a combination thereof.

3. The system of claim 1, where the computer executable instructions to alert the vehicle of the vehicle parking bunching with the vehicle parking bunching notification comprise computer executable instructions to provide a vehicle routing notification for a location of the vehicle parking bunching, a timing notification for the vehicle related to the vehicle parking bunching or a combination thereof.

4. The system of claim 1, where the computer executable instructions to predict the vehicle parking bunching comprise computer executable instructions to use a density-based spatial clustering model.

5. The system of claim 4, where the computer executable instructions to use the density-based spatial clustering model comprise computer executable instructions to use a trained machine learning model.

6. The system of claim 4, where the computer executable instructions to use the density-based spatial clustering model comprise computer executable instructions to use a transfer learning model.

7. The system of claim 1, where the computer executable instructions to predict the vehicle parking bunching further comprise computer executable instructions to predict an area of the geographic region more prone to vehicle parking bunching, predict a number of parking spots likely to become free on this link, predict a number of vehicle parking bunchings per day on links within the geographic region, predict a size of the vehicle parking bunching, predict a map link covered by the vehicle parking bunching based on an event time and/or an event location in the geographic region or a combination thereof.

8. A computer-implemented method for predicting vehicle parking bunching in a geographic region, the method comprising:
- determining parking information in the geographic region using a proximity sensor, a motion detection sensor, an accelerometer, a weather sensor, a positioning sensor or a combination thereof;
- obtaining a plurality of contextual features related to parking information in the geographic region;
- predicting the vehicle parking bunching based on a vehicle unparking threshold, a vehicle separation distance cluster threshold and/or unparking vehicle information; and
- alerting a vehicle of the vehicle parking bunching with a vehicle parking bunching notification.

9. The method of claim 8, where obtaining the plurality of contextual features comprise obtaining map database information, point of interest information, event information, historical parking information, mobility graph information, satellite communications data, radio-frequency communications data, nearby unmanned autonomous vehicle information, historical weather data, driver preference information, reserved parking information, online service information or a combination thereof.

10. The method of claim 8, where alerting the vehicle of the vehicle parking bunching with the vehicle parking bunching notification comprises providing a vehicle routing notification for a location of the vehicle parking bunching, a timing notification for the vehicle related to the vehicle parking bunching, a vehicle parking size recommendation or a combination thereof.

11. The method of claim 8, where predicting the vehicle parking bunching comprise using a density-based spatial clustering model.

12. The method of claim 11, where using the density-based spatial clustering model comprises using a trained machine learning model.

13. The method of claim 8, where predicting the vehicle parking bunching further comprises predicting an area of the geographic region more prone to vehicle parking bunching, predict a number of parking spots likely to become free on this link, predict a number of vehicle parking bunchings per day on links within the geographic region, predict a size of the vehicle parking bunching, predict a map link covered by the vehicle parking bunching based on an event time and/or an event location in the geographic region or a combination thereof.

14. A computer program product comprising a non-transitory computer readable medium having stored thereon computer executable instructions, which when executed by one or more processors, cause the one or more processors to carry out operations to predict a vehicle parking bunching in a geographic region, the operations comprising:
- determining parking information in the geographic region using a proximity sensor, a motion detection sensor, an accelerometer, a weather sensor, a positioning sensor or a combination thereof;
- obtaining a plurality of contextual features related to parking information in the geographic region;
- predicting a vehicle parking bunching based on a vehicle unparking threshold, a vehicle separation distance cluster threshold and/or unparking vehicle information; and
- alerting a vehicle of the vehicle parking bunching with a vehicle parking bunching notification.

15. The computer program product of claim 14, where the operations for obtaining the plurality of contextual features comprise operations for obtaining map database information, point of interest information, event information, historical parking information, mobility graph information, satellite communications data, radio-frequency communications data, nearby unmanned autonomous vehicle information, historical weather data, driver preference information, reserved parking information, online service information or a combination thereof.

16. The computer program product of claim 14, where the operations for alerting the vehicle of the vehicle parking bunching with the vehicle parking bunching notification comprise operations for providing a vehicle routing notification for a location of the vehicle parking bunching, a timing notification for the vehicle related to the vehicle parking bunching, a vehicle parking size recommendation or a combination thereof.

17. The computer program product of claim 14, where the operations for predicting the vehicle parking bunching comprise operations for using a density-based spatial clustering model.

* * * * *